(12) United States Patent
Zaliznyak

(10) Patent No.: US 6,232,818 B1
(45) Date of Patent: May 15, 2001

(54) VOLTAGE TRANSLATOR

(75) Inventor: Arch Zaliznyak, San Jose, CA (US)

(73) Assignee: Xilinx, Inc., San Jose, CA (US)

( * ) Notice: Subject to any disclaimer, the term of this patent is extended or adjusted under 35 U.S.C. 154(b) by 0 days.

(21) Appl. No.: 09/158,723

(22) Filed: Sep. 22, 1998

Related U.S. Application Data

(60) Provisional application No. 60/086,353, filed on May 20, 1998.

(51) Int. Cl.[7] ................................................. H04L 5/00
(52) U.S. Cl. ........................................ 327/333; 326/81
(58) Field of Search ...................... 326/80, 81; 327/319, 327/333

(56) References Cited

U.S. PATENT DOCUMENTS

| | | |
|---|---|---|
| 5,276,366 | 1/1994 | Quigley et al. . |
| 5,300,835 | 4/1994 | Assar et al. . |
| 5,510,731 | 4/1996 | Dingwall et al. . |
| 5,521,531 | 5/1996 | Okuzumi . |
| 5,546,017 | 8/1996 | Vitunic . |
| 5,574,389 | 11/1996 | Chu et al. . |
| 5,612,637 | 3/1997 | Shay et al. . |
| 5,680,064 | 10/1997 | Masaki et al. . |

*Primary Examiner*—Jeffrey Zweizig
(74) *Attorney, Agent, or Firm*—Townsend & Townsend

(57) ABSTRACT

A voltage translator features an isolation circuit, connected to two inverters which are operated by different voltage levels, to selectively isolate one of the inverters from the source voltage associated therewith. The voltage translator also includes a first inverter, a second inverter and a pull-up circuit. The first inverter is coupled between a first source voltage and ground, and has a signal input and an output node. The second inverter is coupled between a second source voltage and ground. The second inverter has an input node, connected to the output node, and a signal output. The pull-up circuit is connected between the input node and the signal output.

11 Claims, 8 Drawing Sheets

VOLTAGE TRANSLATOR

CROSS REFERENCE TO RELATED APPLICATIONS

This application is a nonprovisional application of U.S. provisional patent application VOLTAGE TRANSLATOR U.S. Serial No. 60/086,353, filed May 20, 1998, having Arch Zaliznyak listed as inventor and assigned to DynaChip Corporation. The 60/086,353 application is hereby incorporated by reference in its entirety.

BACKGROUND OF THE INVENTION

The present invention relates to integrated circuits. Specifically, the present invention relates to a voltage level converter and a semiconductor integrated circuit adapting the same, and more specifically to improvement of an interface circuit used between circuits having different driving power sources and for converting a signal level between these circuits.

Integrated circuit geometries continue to decrease in size, providing more devices per unit area on a fabricated wafer. Currently, some devices are fabricated with feature dimensions as small as 0.18 μm. For example, spacing between conductive lines or traces on a patterned wafer may be separated by 0.18 μm leaving recesses or gaps of a comparable size. The reduction in feature dimensions has necessitated reducing the operating voltage of integrated circuits to avoid latch-up and other operational defects. Currently, CMOS circuitry operates at 3.3 volts or 2.5 volts, and there are efforts to reduce the operating voltages further, e.g., in the range between 2.5 and 1.8 volts.

As a result of the continued effort to reduce the operating voltage of integrated circuits, many of the present day circuits operate at differing voltage levels, requiring an interface, typically referred to as a voltage translator. In this fashion, introduction of integrated circuits into the current market is facilitated by allowing the same to operate with integrated circuits having different operating voltages which are typically higher. There has been many prior art attempts at fabricating voltage translators.

Referring to FIG. 1, an example of a prior art voltage translator 10 includes a first stage inverter 12 connected to a second stage inverter 14 via a pass-gate transistor 15. The input 16 of the second stage inverter 14 is connected to the drain 18 of the pass-gate transistor 15, and the output 20 of the first stage inverter 12 is connected to the source 22 thereof. The gate 15a of the pass-gate transistor 15 is connected to a first voltage level referred to as $V_{LOW}$. Both the first and second stage inverters 12 and 14 include a p-channel transistor 24 and 26, respectively, and an n-channel transistor 28 and 30, respectively, each of which has a gate, a source and a drain. The gate 24a of the p-channel transistor 24 is connected to the gate 28a of the n-channel transistor 28, defining the signal input 17 of the voltage translator 10. The source 28b of the n-channel transistor 28 is connected to the drain 24c of the p-channel transistor 24, defining the output 20 of the first stage inverter 12. The drain 28c of the n-channel transistor 28 is connected to ground. The source 24b of the p-channel transistor 24 is connected to the low voltage $V_{LOW}$. The gate 26a of the p-channel transistor 26 is connected to the gate 30a of the n-channel transistor 30, defining the input 16 of the second stage inverter 14. The source 30b of the n-channel transistor 30 is connected to the drain 26c of the p-channel transistor 26, defining the signal output 19 of the voltage translator 10. The drain 30c of the n-channel transistor 30 is connected to ground. The source 26b of the p-channel transistor 26 is connected to a second voltage level that is higher than $V_{LOW}$, referred to as $V_{HIGH}$. A pull-up transistor 32 is connected to the second stage inverter 14 so that the gate 32a thereof is connected to the signal output 19, and the drain 32c is connected to the gates 26a and 30a.

When transitioning from a high to a low signal at the signal input 17, the p-channel FET 24 is activated while the n-channel FET 28 is deactivated. This presents $V_{LOW}$ at output 20. The voltage at the output 20 passes through the pass-gate transistor 15 and is present at the input 16, minus the threshold voltage drop of the pass-gate transistor 15. This voltage, referred to as a switching voltage, activates n-channel FET 30, but is typically insufficient to completely deactivate p-channel FET 26. The signal output 19 is at ground which activates pull-up transistor 32. This allows $V_{HIGH}$ to be present at the input 16, effectively deactivating p-channel FET 26. In this fashion, the pass-gate transistor 15 essentially functions to isolate the $V_{HIGH}$ voltage source from the $V_{LOW}$ voltage source by ensuring that output 20 does not rise above $V_{LOW}$, minus the threshold voltage of pass-gate transistor 15. Otherwise, latch-up would occur.

When transitioning from a low to a high signal at the signal input 17, p-channel FET 24 is deactivated while n-channel FET 28 is activated. This presents ground at output 20, which is sensed at input 16 via pass-gate transistor 15. This deactivates n-channel FET 30 and activates p-channel FET 26. The signal output is $V_{HIGH}$ which deactivates pull-up transistor 32. Typically the high voltage level at the signal input 17 is equal to $V_{LOW}$. In this manner, a high voltage level at the signal input 17 is translated into a higher voltage level at the signal output 19.

U.S. Pat. No. 5,276,366 to Quigley et al. discloses another voltage level translator circuit for interfacing circuitry operating at different voltages. An inverting digital voltage level translator circuit has an input and an output. The input is coupled to a transmission gate, an inverter, and a gate of an n-channel FET. The transmission gate is enabled by the inverter when the input is at a zero logic level. An output of the transmission gate is coupled to both a gate of a p-channel FET and an output of a pull-up circuit. A zero logic level at the input enables p-channel FET through transmission gate and disables the n-channel FET, generating a one logic level at the output. A one logic level at the input enables the n-channel FET transitioning the output to a zero logic level. Output to a control input of pull-up circuit and a zero logic level enables the pull-up circuit to disable the p-channel FET.

U.S. Pat. No. 5,574,389 to Chu discloses interfacing components for VLSI chips designed to migrate from 5 volt designs to lower voltage designs. The interfacing components have different power supplies and pass voltages at the output node of a CMOS buffer circuit to the isolation well of a p-channel FET in a buffer circuit when the voltage at the output node is greater than the voltage at the buffer voltage supply node. This prevents forward biasing the PN junction in the isolation well of the p-channel FET. The circuits also provide the proper voltage level to the gate of the p-channel FET.

U.S. Pat. No. 5,680,064 to Masaki et al. discloses a first level converter with an input transistor circuit and an output transistor circuit. The input transistor circuit is supplied with power from a first power source and outputs a complementary signal on the basis of an input signal. The output transistor circuit is supplied with power from a second power source and amplifies and outputs the complementary signal. A second level converter is provided with a pulse generating circuit and a signal output circuit. The pulse generating circuit is supplied with power from the first driving power source and generates a one-shot pulse signal. The signal output circuit is supplied with power from the second power source and latches the one-shot pulse signal and outputs the signal. The semiconductor integrated circuit is provided with a first circuit system, a level conversion circuit and a second circuit system. The first circuit system is driven by being supplied with power from the first driving power source. The level conversion circuit is supplied with power from the first driving power source and converts an output signal of the first circuit system into an input signal of the second circuit system. The second circuit system drives a signal with the level converted by being supplied with power from the second driving power source. Further, in the semiconductor integrated circuit, a bidirectional level conversion circuit and a signal control means are provided, and the first and the second driving power sources are wired in a lattice form in a semiconductor chip.

What is needed, however, is a voltage translator that operates at voltage levels lower than the voltage levels at which the prior art voltage translators operate.

SUMMARY OF THE INVENTION

A voltage translator features an isolation circuit, connected to two inverters which are operated by different voltage levels, to selectively isolate one of the inverters from the source voltage associated therewith. The voltage translator also includes a first inverter, a second inverter and a pull-up circuit. The first inverter is coupled between a first source voltage and ground, and has a signal input and an output node. For purposes of the present invention, the term "connected" is defined to mean a direct connection, and the term coupled is defined to mean an indirect connection, e.g., a connection between two or more devices through in intermediary device. The second inverter is coupled between a second source voltage and ground, with the second source voltage being greater than the first source voltage. The second inverter has an input node, connected to the output node of the first inverter a signal output. The pull-up circuit is connected between the input node of the second inverter and the signal output. The isolation circuit is connected to both the first and second inverters and in common with the output and input nodes to selectively isolate the first inverter from the first source voltage and, thereby, the second source voltage.

The present invention is based upon the discovery that the pass-gate isolation circuits of the prior art frustrates attempts to reduce the operating voltages of a voltage translator. Specifically, it was found that the adverse effects of the back-bias associated with the pass-gate transistor increases as the operating voltage applied thereto decreases. This causes the voltage threshold of the pass-gate transistor to consume a larger percentage of the voltage supplied to activate/deactivate the FETs associated with the second stage inverter, thereby frustrating operation of the same. To overcome this problem the present invention abrogates the presence of a pass-gate transistor connection between the two inverters and provides an isolation circuit which isolates the two differing operating voltages of the voltage translator.

DESCRIPTION OF THE SPECIFIC EMBODIMENTS

Figure 2:
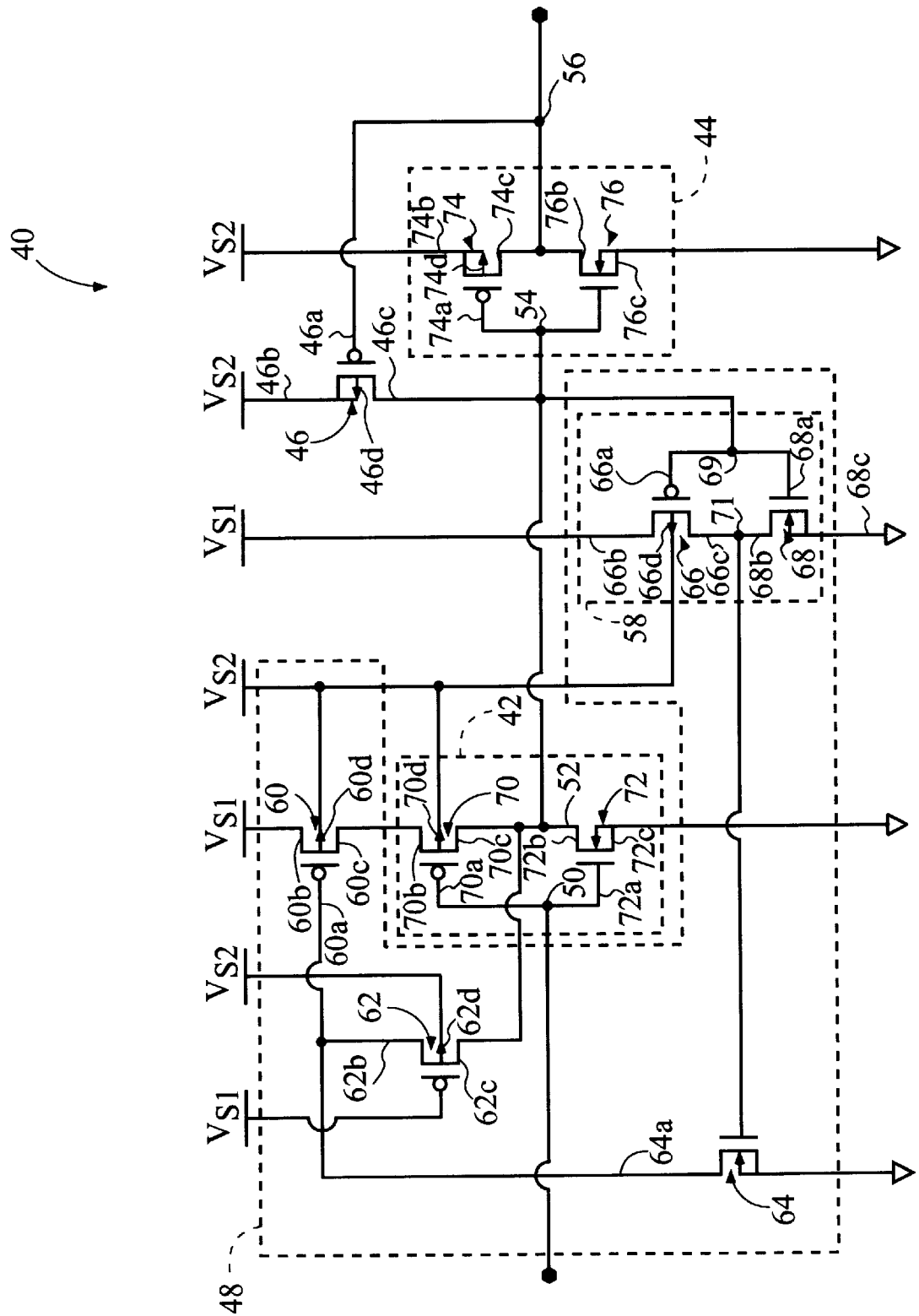
FIG. 2 is a schematic of a voltage translator in accordance with the present invention.

Referring to FIG. 2, a voltage translator 40 includes a first inverter 42 connected to a second inverter 44, a pull-up circuit 46 and an isolation circuit 48. The first inverter is coupled between a first source voltage $V_{S1}$, and ground, and has a signal input node 50 and a signal output node 52. The second inverter 44 is coupled between a second source voltage $V_{S2}$ and ground, with the second source voltage $V_{S2}$ typically being greater than the first source voltage $V_{S1}$. The second inverter 44 has an input node 54 connected to the output node 52. The pull-up circuit 46 is connected between the input node and 54 the output node 56. The isolation circuit 48 is connected to both the first and second inverters 42 and 44 and selectively isolates the first inverter 42 from the second source voltage $V_{S2}$.

Figure 1:
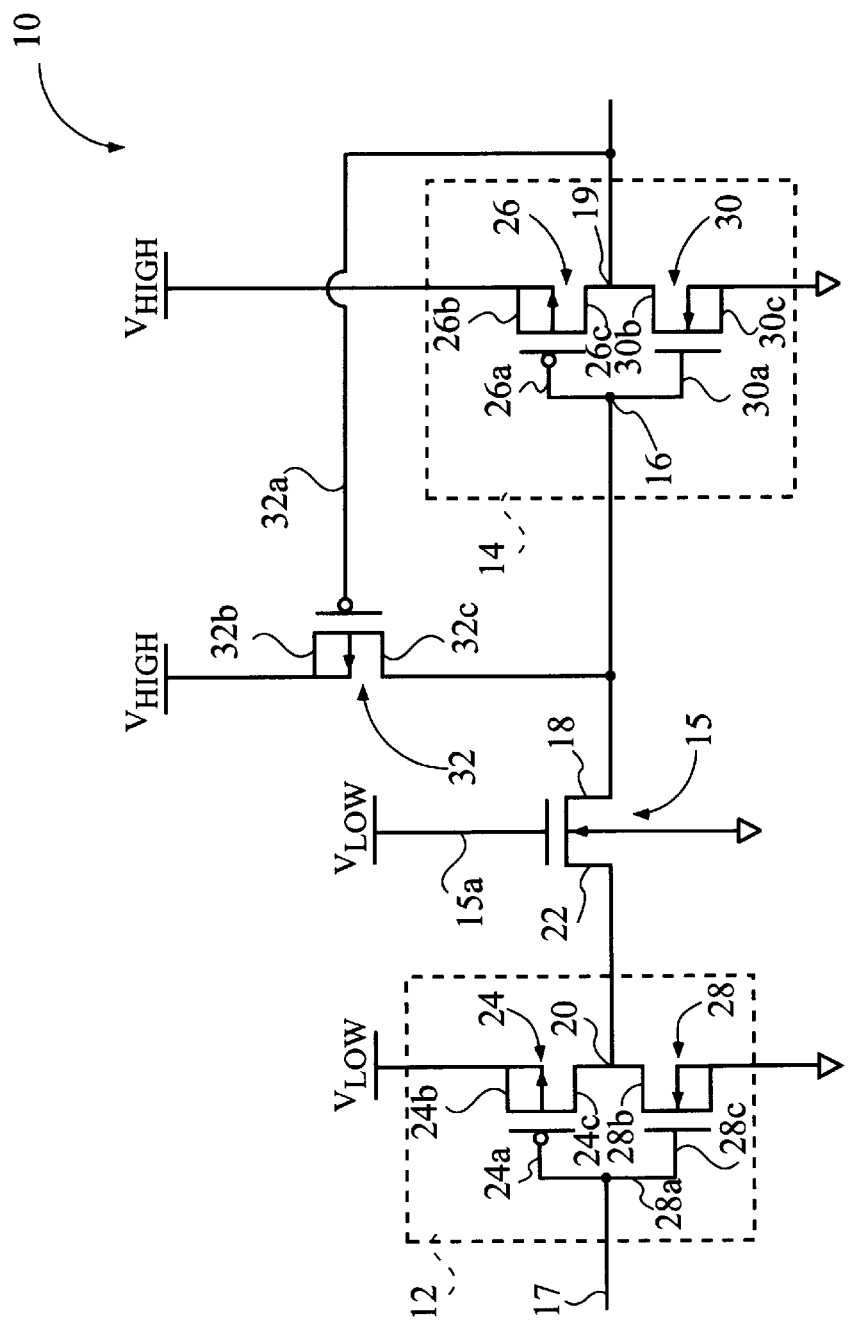
FIG. 1 is a schematic of a prior art voltage translator.

The present invention is based upon the discovery that the pass-gate isolation circuits of the prior art, such as pass-gate transistor 15 discussed above with respect to FIG. 1, frustrates attempts to reduce the operating voltage of the voltage translator. Specifically, it was found that the adverse effects of the back-bias associated with the pass-gate transistor increase as the operating voltage applied thereto decreases. The back-bias associated with the pass-gate transistor 15 results in the voltage threshold of the same to consume a larger percentage of the voltage supplied to activate/deactivate the FETs 26 and 30 associated with the second stage inverter 14, thereby frustrating operation of the same. This proved problematic when transitioning from a high to low signal at the signal input 17. As discussed above, the voltage at the output 20 passes through the pass-gate transistor 15 and is present at the input 16, minus the threshold voltage drop of the pass-gate transistor 15. This voltage is usually sufficient to activate n-channel FET 30, but is insufficient to completely deactivate p-channel FET 26. This dramatically increases the power dissipation of the voltage translator 10. Both the p-channel FET 26 and the n-channel FET 30 conduct concurrently for a short amount of time until the pull-up transistor 26 conducts sufficiently to deactivate p-channel FET 26. In the typical prior art voltage translator, $V_{HIGH}$ would be approximately 3.3 volts, and $V_{LOW}$ would be approximately 2.5 volts.

A further reduction in the operating voltage, $V_{LOW}$, of the first stage inverter 12 results in other adverse effects, in addition to increased power dissipation. Upon reducing the voltage, $V_{LOW}$, the voltage present at the input 16 is also reduced due to subtraction of the threshold voltage of the pass-gate transistor 15. Therefore, the threshold voltage of the pass-gate transistor 15 becomes a limiting factor when attempting to reduce the operating voltage $V_{LOW}$. As the operating voltage approaches 1.8 volts or lower, the voltage threshold across the pass-gate transistor 15 consumes a larger percentage of the voltage propagating therethrough, thereby limiting the voltage available at input 16. This can cause, in addition to an increased current dissipation, speed push-out. In the worst case, operational failure of the voltage translator may result by the voltage present at input 16 lying at or below the noise margin of either the p-channel FET 26 or the n-channel FET 30.

To overcome the aforementioned problems, the voltage translator 40, shown in FIG. 2, abrogates the presence of a pass-gate transistor connection between the two inverters 42 and 44, while providing selective isolation of the first and second source voltages $V_{S1}$, and $V_{S2}$. This is accomplished by providing the isolation circuit 48 that includes a third inverter 58 connected to a pair of p-channel FETs 60 and 62 through a pull-down transistor 64. One of the aforementioned p-channel FETs 60 is connected so that the source 60b of the same is connected to the first source voltage $V_{S1}$. The drain 60c of the p-channel FET 60 is connected to the first inverter 42. The gate 60a of the p-channel FET 60 is connected in common with the source 62b of the p-channel FET 62 and the source 64a of the pull-down transistor 64. The source 62b of the second p-channel FET 62 is connected to the output node 52 of the first inverter 42, and the gate 62a thereof is connected to the first source voltage $V_{S1}$. The third inverter 58 of the isolation circuit 48 includes a pull-up transistor and a pull-down transistor, typically a p-channel FET 66 and an n-channel FET 68, respectively. The gates 66a and 68a of the p-channel FET 66 and the n-channel FET 68 are connected in common, defining an input point 69 of the third inverter 58. The source 66b of the p-channel FET 66 is connected to the first source voltage $V_{S1}$. The drain 66c of the p-channel FET 66 is connected to the source 68b of the n-channel FET 68, defining the output point 71 of the third inverter 58. The gate 64a of the n-channel FET 64 is connected to the output point 71. The drain 68c of the n-channel FET 68 is connected to ground. As can be seen, the well contacts, 46d, 60d, 62d, 66d, 70d and 74d of p-channel FETs 46, 60, 62, 66, 70 and 74, respectively, are connected to $V_{S2}$. The aforementioned well contacts are connected as described to prevent premature operational failure of these FETs, discussed more fully below.

The first inverter 42 includes p-channel FET 70 connected in series with an n-channel FET 72 between the first source voltage $V_{S1}$, and ground. The gate 70a of the p-channel FET 70 is connected to the gate 72a of the n-channel FET 72, defining the signal input 50 of the voltage translator 40. The source 72b of the n-channel FET 72 is connected to the drain 70c of the p-channel FET 70, defining the output node of the first stage inverter 42. The drain 72c of the n-channel FET 72 is connected to ground. The p-channel FET 70 is coupled to the first source voltage $V_{S1}$ via p-channel FET 60. Specifically, the source 70b of p-channel FET 70 is connected to the drain 60c of p-channel FET 60. The second inverter 44 includes a p-channel FET 74 connected in series with an n-channel FET 76 between the first source voltage $V_{S2}$, and ground. The gate 74a of the p-channel FET 74 is connected to the gate 76a of the n-channel FET 76, defining the input node 54 of the second inverter 44. The source 76b of the n-channel FET 76 is connected to the drain 74c of the p-channel FET 74, defining the signal output 56 of the voltage translator 40. The drain 76c of the n-channel FET 76 is connected to ground. The source 74b of the p-channel FET 74 is connected to the second source voltage $V_{S2}$. The pull-up circuit is a p-channel FET 46 connected to the second inverter 44 so that the gate 46a thereof is connected to the signal output 56 and the drain 46c is connected to the gates 74a and 76a. The source 46b of the p-channel FET 46 is connected to the second source voltage $V_{S2}$.

Although any voltage may be applied, typically $V_{S2}$ is greater than $V_{S1}$. Preferably, $V_{S1}$ is in the range of 1.5 to 3.0, inclusive, and $V_{S2}$ is in the range of 3.0 to 5.5, inclusive. However, it should be understood that $V_{S1}$ may be equal to $V_{S2}$. In this fashion, the voltage at signal input 50 will transition between ground and a voltage level that is below $V_{S1}$ and $V_{S2}$. This provides translation from the lower voltage level at signal input 50 and the higher common voltage level of both $V_{S1}$ and $V_{S2}$.

In operation, a signal at the signal input 50 which transitions from high to low deactivates n-channel FET 72 and activates p-channel FET 70, resulting in $V_{S1}$, being present at output node 52. The voltage at output node 52 is sensed by the input node 54 which activates n-channel FET 76 and partially deactivates p-channel FET 74, due to the source 74b of the p-channel FET 74 being connected to $V_{S2}$. This causes the signal output 56 to transition toward ground, thereby activating pull-up circuit 46. Activation of pull-up circuit 46 places $V_{S2}$ on the input node 54, completely deactivating p-channel FET 74.

In a contemporaneous fashion, the $V_{S2}$ voltage at the input node 54 is sensed at the output node 52 and the input point 69. With $V_{S2}$ voltage at the input point 69, the n-channel FET 68 is activated and the p-channel FET 66 is deactivated. This causes the signal output point 71 to transition toward ground, thereby deactivating n-channel FET 64. Also the voltage at the output node 52 is sensed by the drain 62c of p-channel FET 62. Deactivation of n-channel FET 64 and the presence of the $V_{S2}$ voltage on the drain 62c deactivates p-channel FET 60, thereby isolating the $V_{S1}$ source voltage from the $V_{S2}$ source voltage at the junction of the source 70b and the drain 60c. In this fashion, the isolation circuit 48 selectively isolates $V_{S1}$, from the first inverter 42.

The presence of the $V_{S2}$ voltage at the output node 52 makes it advantageous to connect the well contact 70d to $V_{S2}$. In this fashion, latch-up or punch-through of the p-channel FET 70 s avoided. For similar reasons, the contact wells of the remaining p-channel FETs 46, 60, 62, 66, 70 and 74 are connected to $V_{S2}$. For example the well contact 60d of p-channel FET 60 is connected to $V_{S2}$, because the $V_{S2}$ voltage is sensed by the drain 60c of p-channel FET 60.

When transitioning from a low to a high voltage level at the signal input 50, the isolation problem is not as critical and will not be discussed here. Suffice it to say that the corollary to the above activation and deactivation of devices occur.

Figure 3:
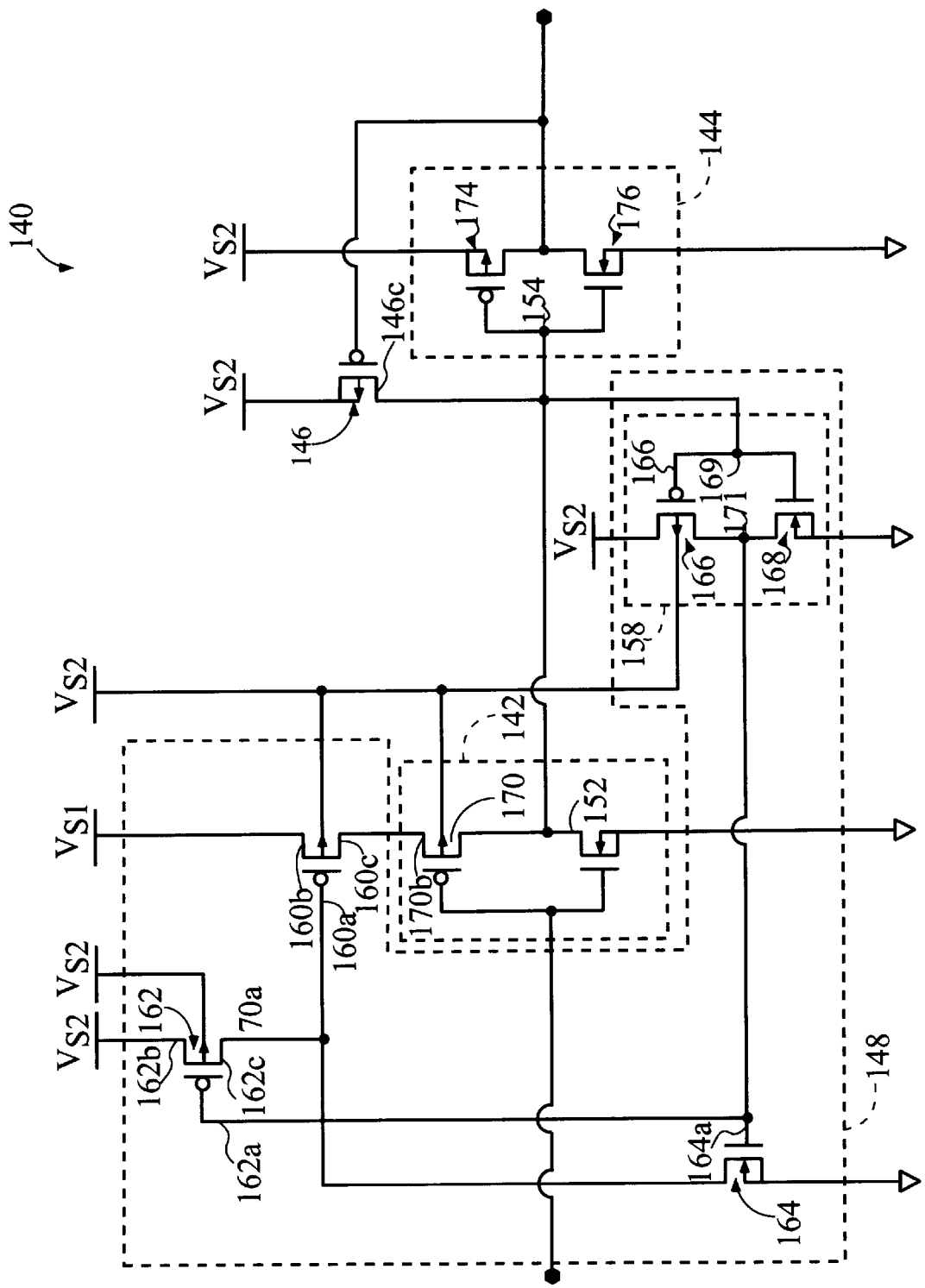
FIG. 3 is a schematic a first alternate embodiment of the voltage translator shown above in FIG. 2.

An alternate embodiment of the voltage translator 40 is shown in FIG. 3 in which a voltage translator 140 includes first and second inverters 142 and 144 and a pull-up circuit 146 which correspond to first and second inverters 42 and 44 and pull-up circuit 46, discussed above with respect to FIG. 2. The isolation circuit 148 of FIG. 3, however, differs from the isolation circuit of FIG. 2. In FIG. 3, the third inverter 158 of the isolation circuit 148 is connected between the second source voltage $V_{S2}$ and ground, instead of the first source voltage $V_{S1}$, and ground, as discussed with respect to the third inverter 58 of FIG. 2. The gate 164a of the n-channel FET 164, shown in FIG. 3, is connected in common with the gate 162a of the p-channel FET 162 and the output point 171 of the third inverter 158. The source 162b of p-channel FET 162 is connected to the second source voltage $V_{S2}$. The gate 160a of p-channel FET 160 is connected in common with the drain 162c, and the source 160b of the p-channel FET 160 is connected to the second source voltage $V_{S1}$. The drain 160c of the p-channel FET 160 is connected to the source 170b of the p-channel FET 170 of the first inverter 142.

In operation, the second inverter 144 may transition from a high voltage to a low voltage output state in a manner discussed above. The voltage at the output node 152 is sensed by the input point 169 which activates n-channel FET 168 and deactivates p-channel FET 166. This causes the signal output point 171 to transition toward ground, thereby deactivating n-channel FET 164 and activating p-channel FET 162. Activation of p-channel FET 162 places $V_{S2}$ on the gate 160a of p-channel FET 160, deactivating the same. In this manner, $V_{S1}$ is isolated from the first inverter 144 and, therefore from $V_{S2}$ at the junction of the source 170b and the drain 160c.

Figure 4:
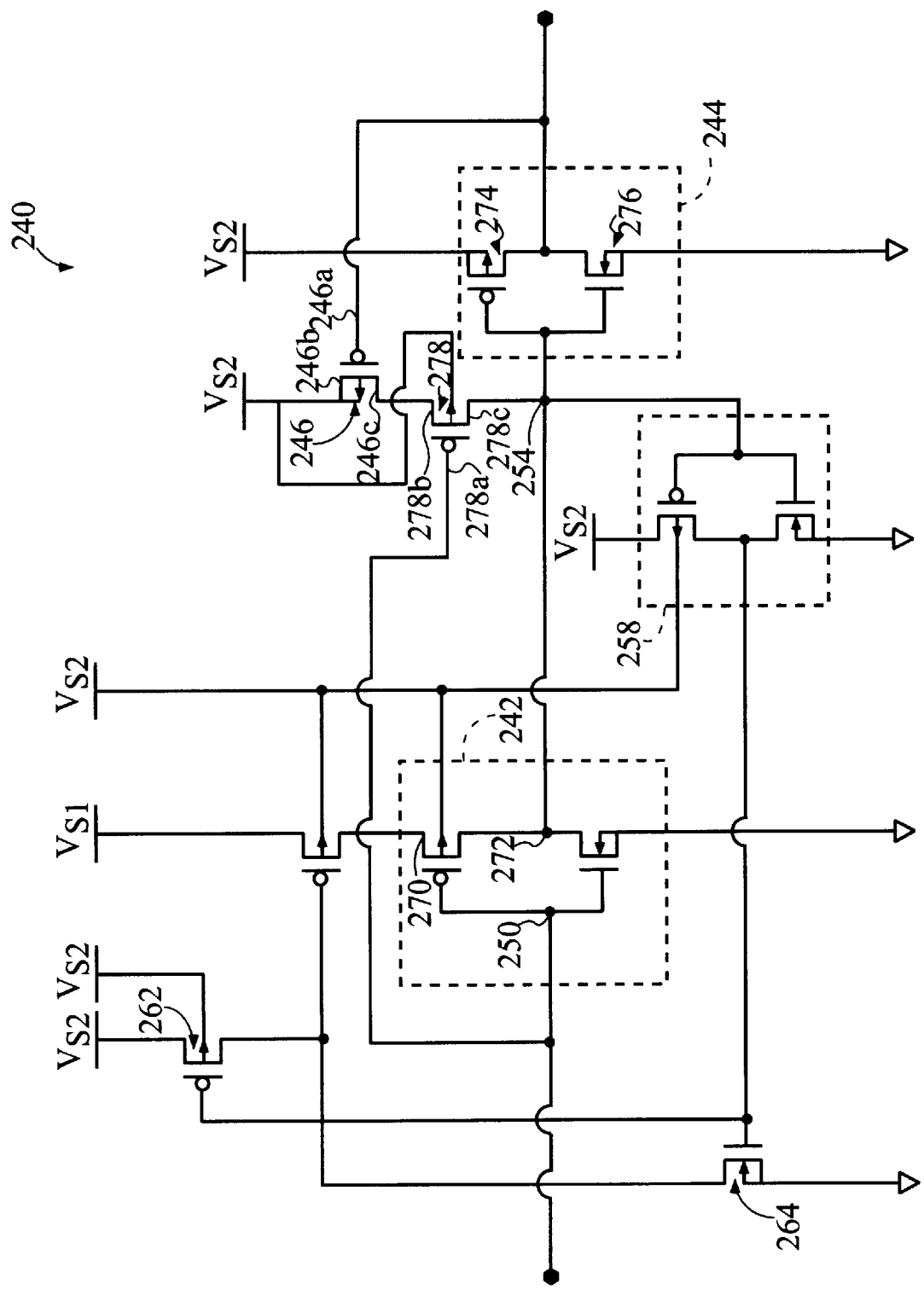
FIG. 4 is a schematic a second alternate embodiment of the voltage translator shown above in FIG. 3.

The power dissipation of the voltage translator 140 is reduced by including an additional p-channel FET in series between the p-channel FET 146 and the input node 154 of the second inverter 144. As shown in FIG. 4, voltage translator 240 is identical to voltage translator 140, discussed above with respect to FIG. 3, except that in FIG. 4, p-channel FET 278 is connected in series between the p-channel FET 246 and the input node 254 of the second inverter 244. Specifically, the source 278b of the p-channel FET 278 is connected to the drain 246c of the p-channel FET 246, and the drain 278c of the p-channel FET 278 is connected to the input node 254. The gate 278a is connected to the signal input 250 of the voltage translator 240. In this manner, an input signal to the voltage translator 240, going from low to high, causes the p-channel FET 278 to turn-off. This isolates the first inverter 242 from $V_{S2}$, thereby avoiding the delay time in placing ground at the input node 254 of the second inverter 244.

Specifically, the input node 254 is at $V_{S2}$ when the signal input 250 transitions from a low to a high. As a result of the signal transition at the signal input 250, the output node 252 of the first inverter 242 swings from a high to ground due to p-channel FET 270 being deactivated and n-channel FET 272 being activated. The presence of $V_{S2}$ at the input node 254, when n-channel FET 252 conducts, increases the speed push-out and the power dissipation of the voltage translator 240. The inclusion of p-channel FET 278 avoids the aforementioned power dissipation and speed push-out problems by turning-off p-channel FET 278, thereby avoiding $V_{S2}$ from being present at the input node 254.

Figure 5:
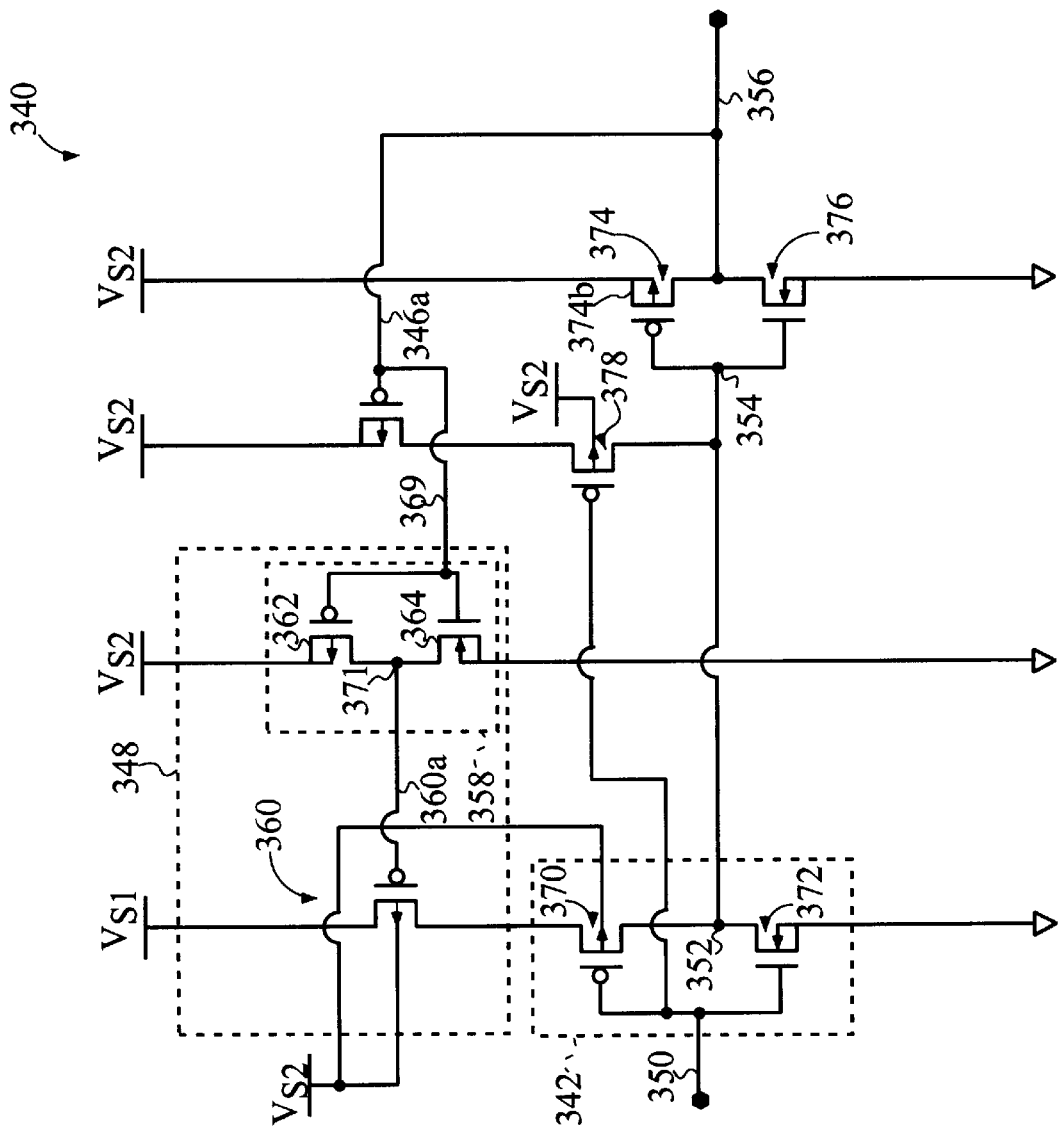
FIG. 5 is a schematic a third alternate embodiment of the voltage translator shown above in FIG. 4.

In another embodiment, the voltage translator 240, discussed above with respect to FIG. 4, is modified so that the inverter 258 is abrogated. To that end, the voltage translator 340, shown in FIG. 5, has an isolation circuit 348 includes p-channel FETs 362 and 360, as well as n-channel FET 364. The p-channel FET 362 and the n-channel FET 364 correspond to p-channel FET 262 and the n-channel FET 264 shown in FIG. 4. However, as shown in FIG. 5, the gates 362a and 364a are connected in common with the gate 346a of the pull-up circuit 346. The drain 362c and the source 364b are connected in common with the gate 360a. The source 362b is connected to $V_{S2}$ and the drain 369c is connected to ground.

In operation, a signal at the signal input 350 which transitions from high to low deactivates n-channel FET 372 and activates p-channel FET 370, resulting in $V_{S1}$ being present at output node 352. The voltage at output node 352 is sensed by the input node 354 which activates n-channel FET 376 and partially deactivates p-channel FET 374, due to the source 374b of the p-channel FET 374 being connected to $V_{S2}$. This causes the signal output 356 to transition toward ground, thereby activating pull-up circuit 346. Activation of pull-up circuit 346 places $V_{S2}$ on the input node 354 via p-channel FET 378. The presence of $V_{S2}$ on the input node 354 completely deactivates p-channel FET 374.

The $V_{S2}$ voltage at the input node 354 is sensed at input point 369 of third inverter 358. With $V_{S2}$ voltage at the input point 369, the n-channel FET 364 is activated and the p-channel FET 362 is deactivated. This causes the signal output point 371 to transition toward ground, thereby deactivating p-channel FET 360. The deactivation of p-channel FET 360 isolates $V_{S1}$, from the first inverter 342.

When a signal at the signal input 350 transitions from low to high, n-channel FET 372 is activated and p-channel FET 370 is deactivated, resulting in ground being present at output node 352, which is sensed by the input node 354. Contemporaneous with the activation of p-channel FET 370 and deactivation of n-channel FET 372, $V_{S2}$ is isolated from output node 352 via deactivation of p-channel FET 378. Specifically, the gate 378a of p-channel FET 378 is connected to the signal input 350 and deactivated upon the transition of a signal thereat from low to high.

The ground potential at the input node 354 activates p-channel FET 374 and deactivates n-channel FET 376. This causes the signal output 356 to transition toward $V_{S2}$, thereby deactivating pull-up circuit 346, placing ground input node 354. The ground potential at the gate 346a, is sensed at input point 369 of third inverter 358. The ground potential at the input point 369, deactivates the n-channel FET 364 activates the p-channel FET 362, causing the signal output point 371 to transition toward $V_{S2}$. This activates p-channel FET 360 providing a conductive path between $V_{S1}$ and ground through p-channel FET 370 and n-channel FET 372.

Figure 6:
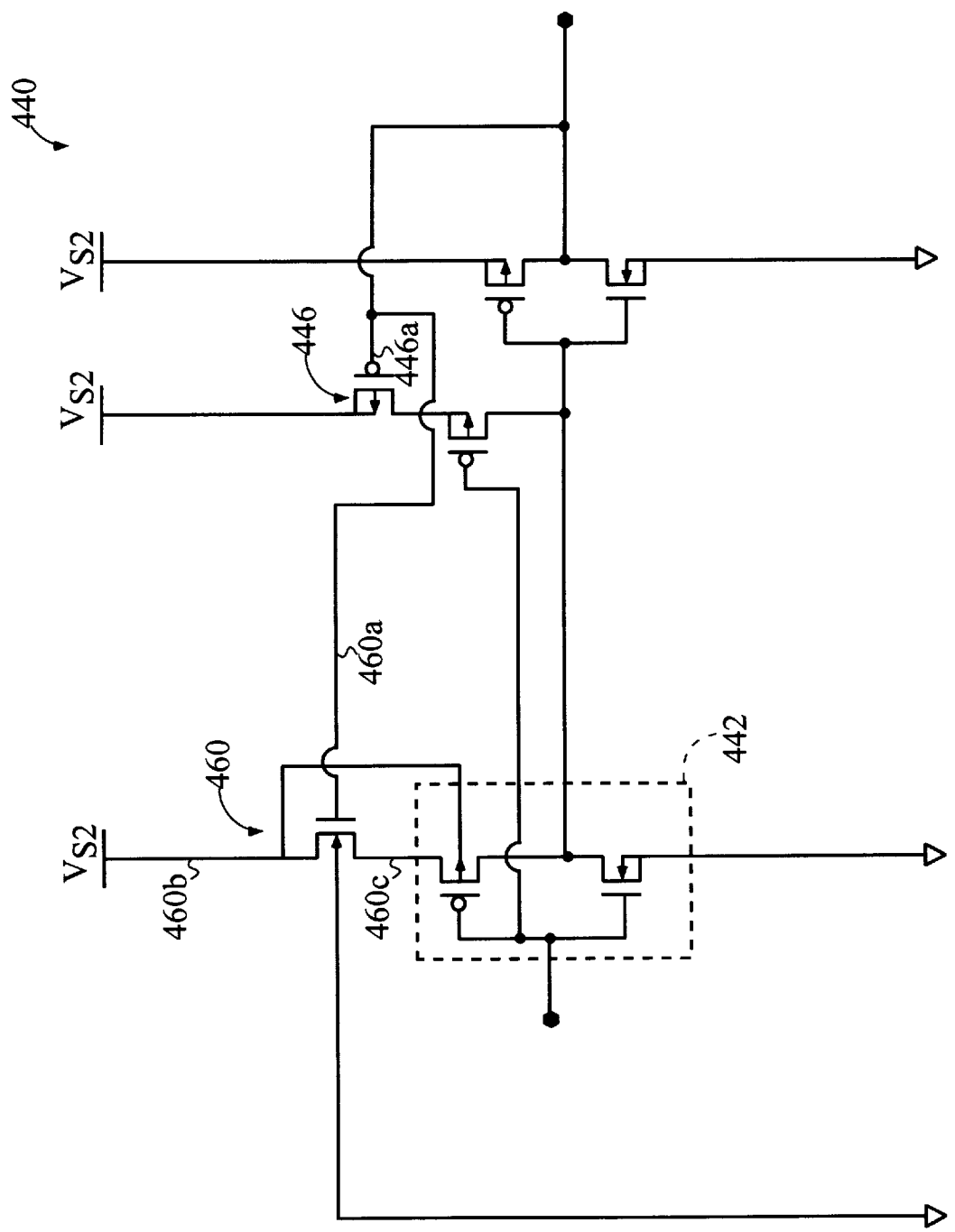
FIG. 6 is a schematic a first alternate embodiment of the voltage translator shown above in FIG. 5.

Referring to FIG. 6, in an alternate embodiment, the voltage translator 340 of FIG. 5 may be modified by replacing p-channel isolation FET 360 with an n-channel FET 460 having a source 460b connected to $V_{S2}$ and a drain 460c connected to the first inverter 442. In this fashion, the third inverter 358, shown in FIG. 5 is abrogated in FIG. 6. As a result, the gate 446a of pull-up FET 446 is connected directly to the gate 460a of the n-channel FET 460, thereby reducing the number of components necessitated to produce the voltage translator 440.

Figure 7:
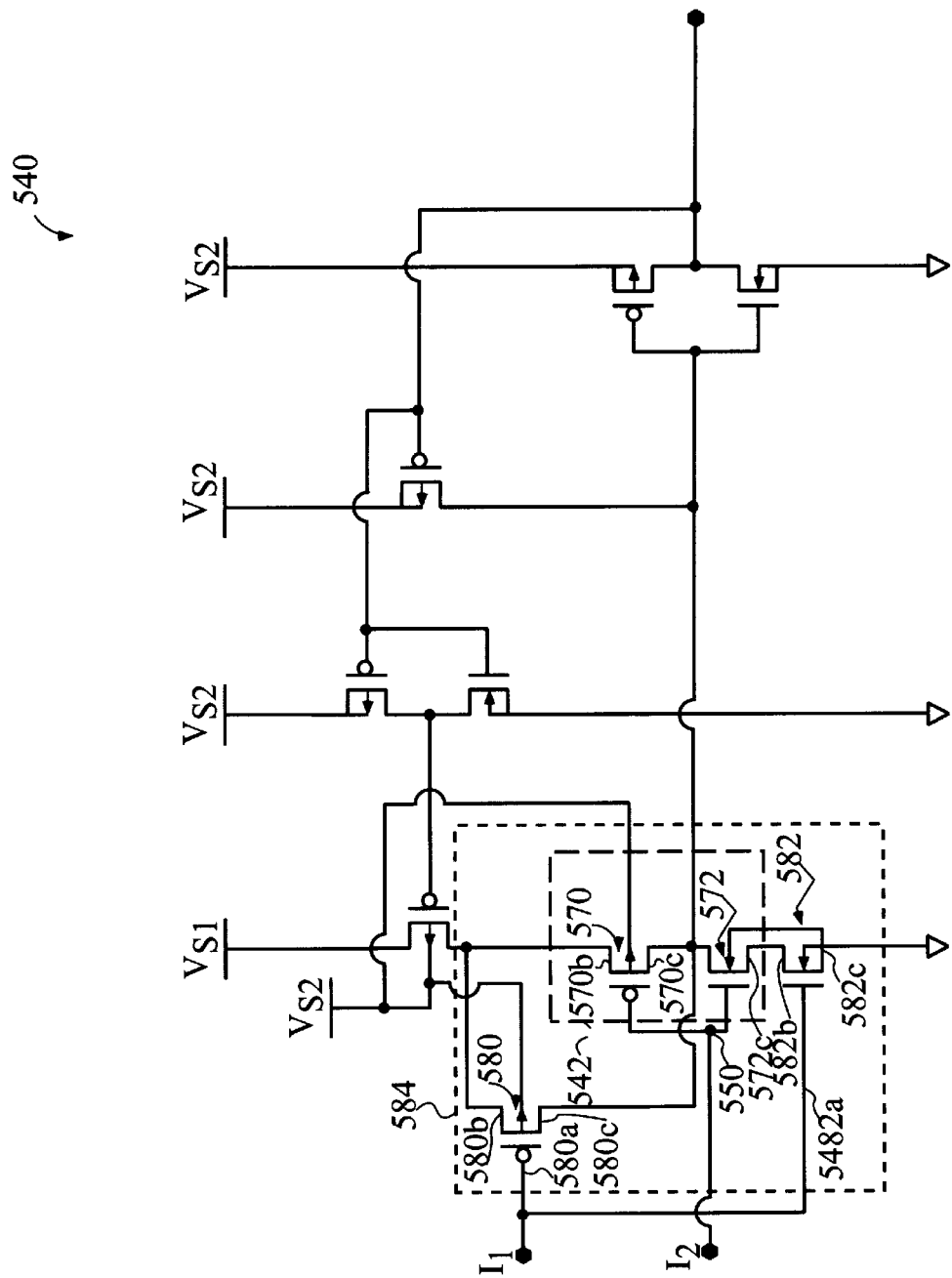
FIG. 7 is a schematic a second alternate embodiment of the voltage translator shown above in FIG. 5.
Figure 8:
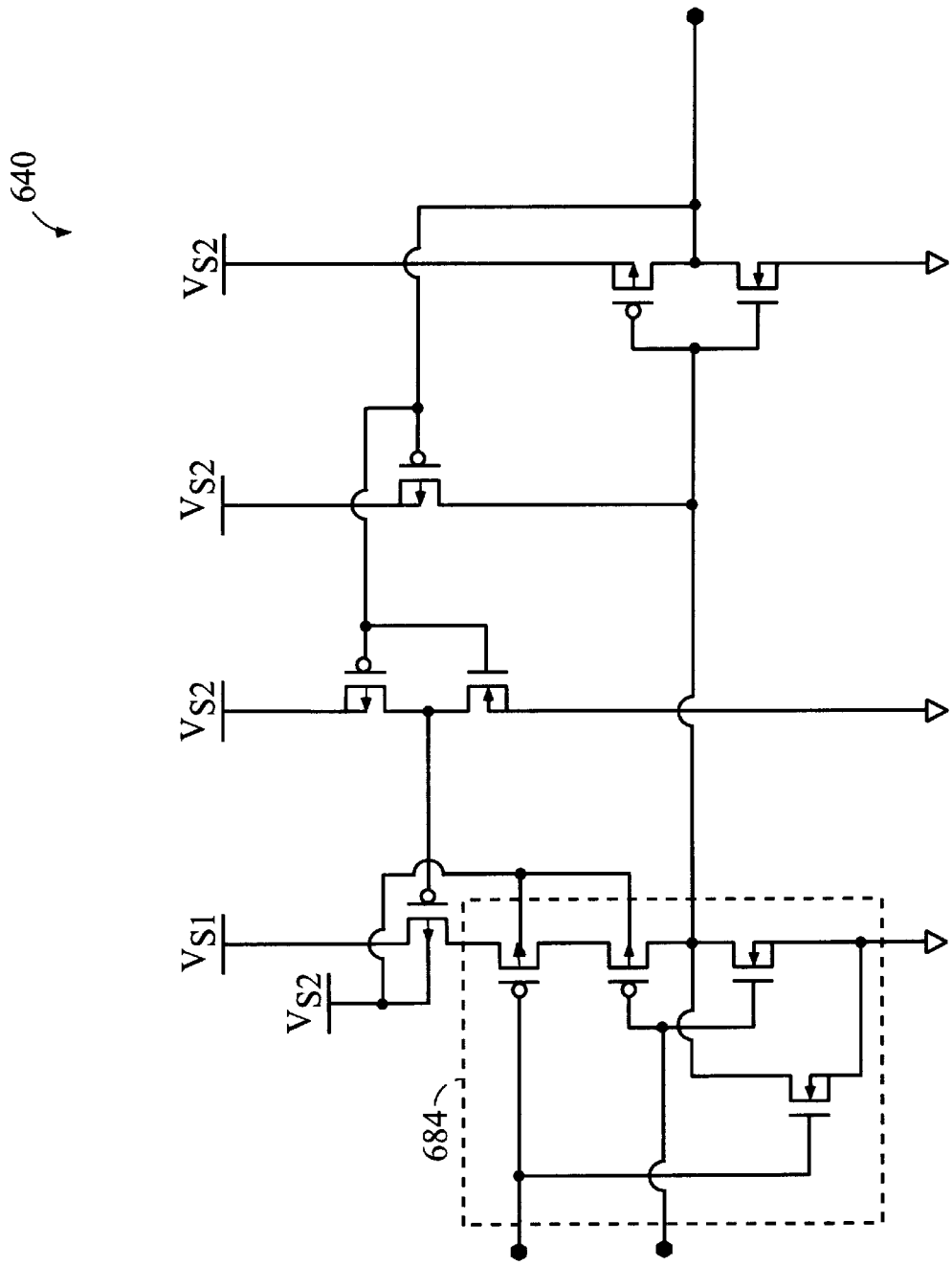
FIG. 8 is a schematic a third alternate embodiment of the voltage translator shown above in FIG. 5.

In addition, as shown in FIG. 7, the voltage translator 540 may have certain logic gates incorporated therein, without substantially increasing the size of the same. For example, voltage translator 540 is essentially identical to voltage translator 340 discussed above with respect to FIG. 5, except that there is no transistor corresponding to p-channel transistor 378 present in voltage translator 540 of FIG. 7. As seen in FIG. 7, the voltage translator 540 has associated therewith, a NAND function which is provided by a p-channel FET 580 and an n-channel FET 582. The p-channel FET 580 is connected in parallel with the p-channel FET 570 of the first inverter 542. More particularly, the source 580b of the p-channel FET 580 is connected to the source 570b of the p-channel FET 570, and the drain 570c thereof is connected to the drain 580c of the p-channel FET 580. The n-channel FET 582 has a gate 582a connected in common with the gate 580a of p-channel FET 580, defining a first input $I_1$ of the NAND gate. The signal input 550 defines the second input of the NAND gate $I_2$. The drain 572c of the n-channel FET 572 is connected to the source 582b of the n-channel FET 582, and the drain 582c of the n-channel FET 582 is connected to ground. In this manner, the NAND gate 584 is defined by p-channel FETs 580 and 570, as well as n-channel FETs 572 and 582. In a similar manner, a NOR gate 684 may be coupled to the voltage translator 640, shown in FIG. 8.

What is claimed is:

1. A voltage translator, comprising:

a first inverter coupled between a first source voltage and a ground, said inverter having a signal input and an output node;

a second inverter coupled between a second source voltage and said ground, said second inverter having an input node, connected to said output node of said first inverter, and a signal output; and an isolation circuit, coupled to both of said first and second inverters, to selectively isolate said first source voltage from said first inverter, said isolation circuit being controlled by feedback from said first and second inverters.

2. The translator as recited in claim 1 wherein said first inverter includes a pull-down transistor connected in series with a pull-up transistor, with said pull-up transistor having a well-contact connected to said second source voltage.

3. The translator as recited in claim 1 further including a p-channel FET connected between said input node of said second inverter and said second source voltage.

4. A voltage translator, comprising:

a first inverter coupled between a first source voltage and a ground, said inverter having a signal input and an output node;

a second inverter coupled between a second source voltage and said ground, with said second source voltage being greater than said first source voltage, said second inverter having an input node, connected to said output node of said first inverter, and a signal output; and an isolation circuit, coupled to both of said first and second inverters, to selectively isolate said first source voltage from said first inverter, wherein said isolation circuit includes:

a p-channel FET connected between said first inverter and said first source voltage, said p-channel FET having a gate node; and a third inverter having input and output points, with said input point being connected in common with said input node of said second inverter and said output node of said first inverter, and with said output point controlling said gate node of said p-channel FET. voltage.

5. The translator as recited in claim 4 wherein said output point of said third inverter controls said gate node of said p-channel FET by controlling a pull-down transistor coupled between said gate node and said around.

6. A voltage translator, comprising:

a first inverter coupled between a first source voltage and a ground, said inverter having a signal input and an output node;

a second inverter coupled between a second source voltage and said ground, with said second source voltage being greater than said first source voltage, said second inverter having an input node, connected to said output node of said first inverter, and a signal output; and an isolation circuit, coupled to both of said first and second inverters, to selectively isolate said first source voltage from said first inverter, wherein said first inverter includes a pull-down transistor connected in series with a pull-up transistor, with said isolation circuit including a p-channel FET connected in series between said first inverter and said first source voltage.

7. A voltage translator, comprising:

a first inverter defining a signal input and having an output node;

a p-channel isolation FET connected between said first inverter and a first source voltage, with said first inverter connected between said p-channel isolation FET and a ground;

a second inverter coupled between a second source voltage and said ground, said second inverter having an input node, connected to said output node of said first inverter, and defining a signal output; and a third inverter having input and output points, with said input point being connected in common with said input node of said second inverter and said output node of said first inverter, and with said output point selectively activating and deactivating said p-channel isolation FET.

8. The voltage translator as recited in claim 7 further including a pull-up circuit connected between said output node of said first inverter and said second voltage source to selectively apply said second voltage source to said output node.

9. The translator as recited in claim 7 wherein said first inverter includes a pull-down transistor connected in series with a pull-up transistor, said pull-up transistor having a well-contact, with the well-contact of said pull-up transistor being connected to said second source voltage.

10. The translator as recited in claim 7 wherein said first and second source voltages are at the same voltage level.

11. A voltage translator, comprising:

a first inverter coupled between a first source voltage and a ground, said inverter defining a signal input and having an output node, wherein said first inverter includes a pull-down transistor connected in series with a pull-up transistor, each of which has a well-contact, with the well-contact of said pull-up transistor being connected to a second source voltage;

a second inverter coupled between said second source voltage and said ground, with said second source voltage being greater than said first source voltage, said second inverter having an input node, connected to said output node of said first inverter, and a signal output;

a pull-up circuit connected between said input node of said second inverter and said second source voltage and controlled by said signal output to selectively place said second source voltage on said output node;

a p-channel isolation FET connected between said first inverter and a first source voltage; and a third inverter having input and output points, with said input point being connected in common with said input node of said second inverter and said output node of said first inverter, and with said output point selectively activating and deactivating said p-channel isolation FET, with said first inverter connected between said p-channel isolation FET and a ground.

* * * * *